United States Patent [19]
Granberg et al.

[11] Patent Number: 6,101,387
[45] Date of Patent: Aug. 8, 2000

[54] PROVIDING NOTIFICATION OF LOCATION DEPENDENT SERVICES TO MOBILE STATIONS

[75] Inventors: Christer Granberg; Anders Olin, both of Stockholm, Sweden

[73] Assignee: Telefonaktiebolaget LM Ericsson, Stockholm, Sweden

[21] Appl. No.: 08/971,735

[22] Filed: Nov. 17, 1997

[51] Int. Cl.[7] .............................. H04Q 7/20; H04M 3/42
[52] U.S. Cl. ..................... 455/433; 455/435; 455/414; 455/432; 455/456
[58] Field of Search .................... 455/413, 414, 455/415, 416, 417, 432, 433, 456, 426, 525, 552, 560, 435

[56] References Cited

U.S. PATENT DOCUMENTS

| | | |
|---|---|---|
| 5,497,412 | 3/1996 | Lannen et al. . |
| 5,504,804 | 4/1996 | Widmark et al. ..................... 455/433 |
| 5,588,042 | 12/1996 | Comer .................................. 455/433 |
| 5,613,213 | 3/1997 | Naddell et al. ...................... 455/414 |
| 5,815,810 | 9/1998 | Gallant et al. ...................... 455/433 |
| 5,839,076 | 11/1998 | Becher ................................ 455/433 |
| 5,903,832 | 5/1999 | Seppanen et al. .................. 455/432 |
| 5,905,954 | 5/1999 | Nguyen ............................... 455/433 |
| 5,915,214 | 6/1999 | Reece et al. ........................ 455/432 |
| 5,920,820 | 7/1999 | Qureshi et al. ..................... 455/433 |

FOREIGN PATENT DOCUMENTS

| | | |
|---|---|---|
| 0 685 972 | 12/1995 | European Pat. Off. . |
| 97/07641 | 2/1997 | WIPO . |

OTHER PUBLICATIONS

D.M. Hlavacek et al., *Bell Labs Technical Journal*, vol. 2, No. 3, Jun. 21, 1997, pp. 20–29, XP000703738, "Alternative Methods for Introducing New Wireless Intelligent Network Services Using Triggers and Queries".

*European Telecommunications Standards Institute (ETSI)*, TS 101 044 V5.1.0 (1997–08), Technical Specification, Digital cellular telecommunications system (Phase 2+); Customized Applications for Mobile network Enhanced Logic (CAMEL)—Stage 2, (GSM 03.78 version 5.1.0).

*Primary Examiner*—Reinhard J. Eisenzopf
*Assistant Examiner*—Lester G. Kincaid
*Attorney, Agent, or Firm*—Nixon & Vanderhye P.C.

[57] ABSTRACT

A mobile communications system includes a plurality of location areas for providing mobile communications services to mobile subscribers. A first set of services is provided to subscribers in a first location area. A second set of services is provided to mobile subscribers in a second location area. When a mobile subscriber leaves the first location area and enters the second location area, the second set of services supported by the second location area is communicated to the mobile subscriber. In an example embodiment, the determination of the second set of services supported by the second location area and the communication of that second set of services to the mobile subscriber are performed as an intelligent network type service.

22 Claims, 6 Drawing Sheets

PROVIDING NOTIFICATION OF LOCATION DEPENDENT SERVICES TO MOBILE STATIONS

RELATED APPLICATIONS

This application is related to the following (all of which are incorporated herein by reference), U.S. patent application Ser. No. 08/912,929, entitled "Transfer of Calling Party Identification in a Mobile Communication System," filed Aug. 15, 1997; U.S. patent application Ser. No. 08/964,212, entitled "Method and Apparatus for Providing Network-Specific Mobile Services," filed Nov. 4, 1997; and U.S. patent application Ser. No. 08/986,387, entitled "Method and Apparatus for Coordinating Mobile Communications Network Services With Intelligent Network-Based Services," filed Dec. 8, 1997.

FIELD OF THE INVENTION

The present invention relates to mobile communications, and more particularly, to informing mobile subscribers of services that are available in particular geographical areas.

BACKGROUND AND SUMMARY OF THE INVENTION

In mobile radio communication networks, such as cellular telephone systems, neighboring radio cells provide coverage of a geographical area to be serviced. Each cell includes a base station (BS) operating on a set of radio channels. Over such radio channels communications are provided to and from mobile subscribers. A mobile switching center (MSC) controls calls between a group of base stations and the public switched telephone network (PSTN), integrated services digital network (ISDN), and one or more public land mobile radio networks (PLMN). The MSC performs call switching, routing, and charging functions.

All mobile communication networks provide "basic call services" required for making and receiving calls in home and in foreign (hereinafter referred to as "visiting") mobile communication networks. In fact, known cellular systems like the Nordic Mobile Telephone System (NMT), the Total Access Communication System (TACS), the American Digital Cellular System (ADC), the Global System for Mobile Communication (GSM), and the Pacific Digital Cellular System (PDC) have adopted standard techniques for providing such basic services. In addition to connecting calls to/from individual mobile subscribers, basic service may also include services available to all mobile subscribers without requiring an individual service subscription.

Intelligent networks (IN) were developed to provide additional, more flexible services to supplement existing telephony services in the fixed telephony network. More recently, such IN-based services have also become necessary and/or desirable in mobile telecommunications networks. The term "standard supplementary services" is defined to include those supplementary services which generally require an individual subscription before that service can be invoked and which are generally supported by most mobile communication networks. Standard supplementary services include for example call waiting, call forwarding, and call barring. Standard supplementary subscriber services may be divided into two types: (1) those which modify or supplement the process of originating a mobile call and (2) those which modify or supplement the process of terminating a mobile call. Examples of originating supplementary services include: barring of outgoing calls and closed user group. Examples of terminating subscriber services include: barring incoming calls, call forwarding, and call waiting.

A third category of services is network-specific supplementary services. In contrast to the standard supplementary services offered in a standard format by all mobile communication network, network-specific supplementary services are not standardized. Instead, intelligent network type tools and capabilities, particular switch based functions or other means available in the particular network are employed by each operator to quickly design and offer specially tailored services for mobiles being served by that operator's network.

The present invention is particularly concerned with the provision of standard and network-specific supplementary services to mobile subscribers moving between different mobile networks, services areas, location areas, etc. To accommodate the changing location of mobile subscribers, a database is generally required in each mobile communications network to keep track of particular mobile subscribers. In the GSM cellular system, for example, a home location register (HLR) database is implemented as a network node. The HLR stores information for each mobile subscriber such as the mobile subscriber's identification, location, (i.e., the MSC currently serving the present location of the mobile subscriber), and supplementary service information. The HLR typically assists in the managing of supplementary services to the extent that it stores information such as subscriber categories and call forwarding numbers.

The example adopted for purposes of explanation to describe implementation of standard supplementary services and network-specific services is the GSM system coupled with the Customized Applications for Mobile Network Enhanced Logic (CAMEL) standard published by the European Telecommunications Standards Institute (ETSI) as GSM Technical Specification 03.78. The goal of CAMEL is to provide mobile network operators with tools to permit them to readily design and offer new and enhanced mobile services. Such rapid supplementary service development and enhancement are achieved using Intelligent network techniques. A service control point (SCP) is a node that stores and implements service logic underlying supplementary services. A service switching point (SSP) is a node that handles switching functions necessary to enable the services invoked by the SCP.

The set of supplementary services available for a mobile subscriber roaming between different mobile networks depends on support for those services provided by the mobile network currently serving the mobile subscriber. Those services which are not standardized, such as those specifically designed by individual mobile network operators, may well only be supported in that operator's network and nowhere else. In addition, support for supplementary services may also depend on the functionality supported by the serving network elements, e.g., an MSC, protocols and interfaces supported by those network elements, roaming agreements between network operators, and other factors.

Currently, network operator-specific services do not function when the mobile subscriber roams outside of that operator's mobile network. However, this situation is changing. For example, with the introduction of the now evolving GSM, Phase 2+ CAMEL standard, it may be possible to support a number of network operator-specific services to the mobile subscriber when that mobile subscriber is roaming to a visiting network. On the other hand, there will likely always be some services that are only supported in the home mobile communications network.

Consequently, it is and will continue to be difficult for mobile subscribers to know exactly what services are accessible or otherwise provided to them when they enter into different mobile communications networks, service areas, etc. While it is possible to document this information in network operator's manuals, such manuals are unlikely to be carried by the mobile subscriber when he actually needs them. Even if such manuals are consulted by the user, those manuals would soon be outdated. The updated manuals would need to be redistributed to the subscribers every time the set of services in a particular service area changes. Moreover, looking up service information in manuals for particular service areas is inconvenient and time consuming.

It is an object of the present invention to remedy these shortcomings.

It is a further object of the present invention to provide a real-time, user-friendly indication to mobile subscribers which services are available to a subscriber entering into a new service area like a visiting mobile network.

In the present invention, each mobile subscriber is provided with a first set of services in its home network, location area, or service area. For ease of description, the term "location area" is adopted as a general term referring to any geographical area which may support a different set of mobile services. When the mobile subscriber leaves a first location area and enters a second location area, a second set of services specifically supported by the second location area is communicated to the mobile subscriber. The second set of services may include only those services subscribed to by the mobile subscriber which are supported by the second location area, or the second set may include all services supported by the second location area. The first and second sets of services may be different or they may be the same. More specifically, when the mobile subscriber registers with the second location area, the second set of services supported by that second location area is determined.

In a preferred example embodiment, an intelligent network service makes that determination and communicates the second set of services to the mobile subscriber either by a text message or a voice announcement. An intelligent network control node such as a service control point (SCP) is preferably provided and connected to a home location register (HLR) database associated with the mobile's home location area as well as a visiting location register (VLR) database associated with the second location area. The SCP uses subscriber and location data from the HLR or the VLR and other relevant data available to the SCP to determine the second set of services available to the one subscriber.

In one example embodiment, the SCP sends a text message of the second set of services to the mobile subscriber by way of the HLR and MSC/VLR. In an alternative example implementation, the SCP sends a voice announcement including the second set of services by establishing a separate speech connection from voice announcement equipment to the mobile subscriber using an intelligent network service switching function (SSF) and specialized resource function (SRF).

BRIEF DESCRIPTION OF THE DRAWINGS

These features and objects of the present invention (as well as others) will now be described in conjunction with the drawings in which.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, while the present invention is described in the context of an example cellular telephone network using GSM terminology, those skilled in the art will appreciate that the present invention can be implemented in any cellular telephone system. In other instances, detailed descriptions of well-known methods, interfaces, devices, and signaling techniques are omitted so as not to obscure the description of the present invention with unnecessary detail.

Figure 1:
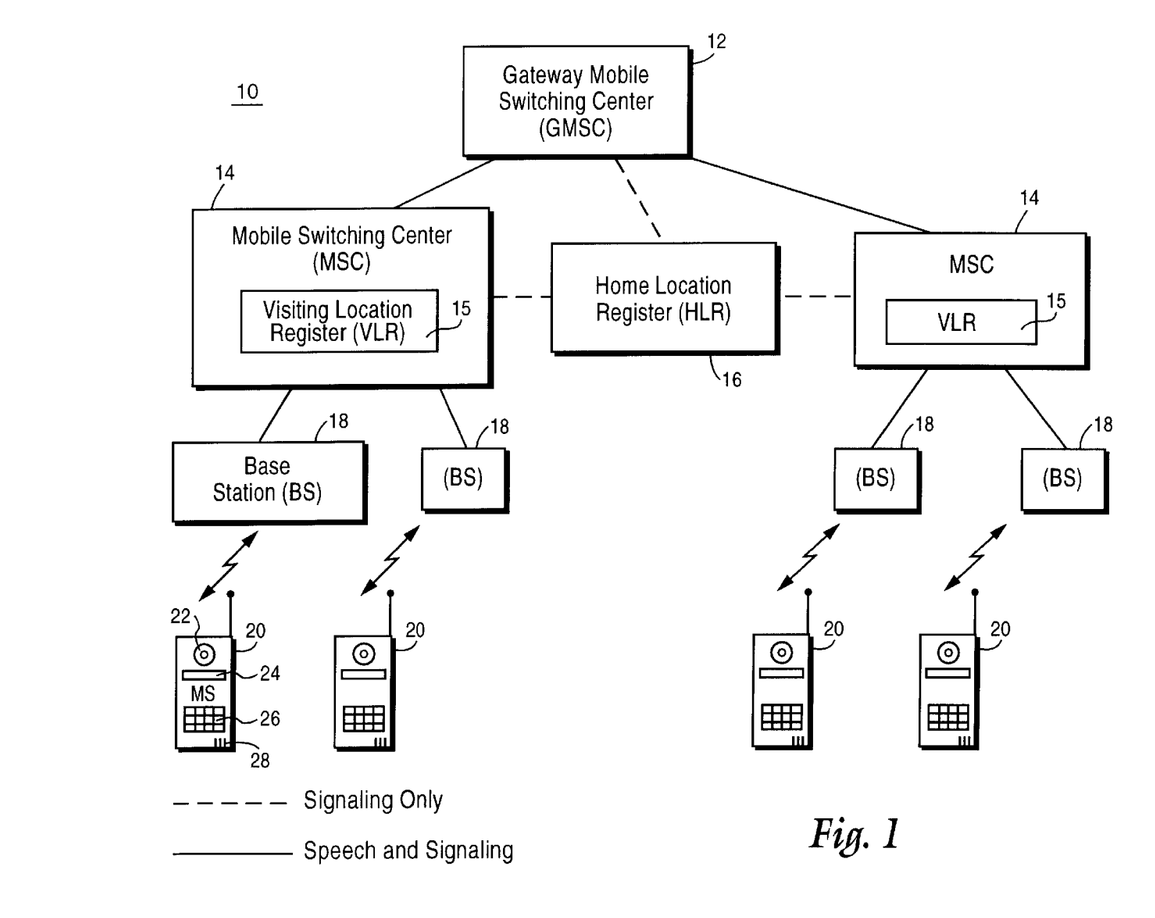
FIG. 1 is a function block diagram of an example Public Land Mobile radio communications network (PLMN) in which the present invention may be implemented.

FIG. 1 illustrates an example Public Land Mobile communications Network (PLMN) 10 in which the present invention may be implemented. PLMN 10 may include one or more location areas. For example, each mobile switching center 14 may service a different location area and support a different group of mobile services. A Mobile Switching Center (MSC) 14 or Gateway Mobile Switching Center (GMSC) 12 interfaces with other telecommunications networks such as the public switched telephone network (PSTN), integrated services digital network (ISDN), or a cellular network, etc. The GMSC 12, connected to one or more other mobile switching centers (MSC) 14, is the point where calls to mobile subscribers enter the PLMN 10. Each mobile terminating call must therefore be routed via the GMSC 12. The GMSC 12 contains signaling functions for retrieving from a home location register (HLR) 16 information needed for a mobile call setup. Based on the results of the interrogation, the GMSC 12 identifies an MSC node currently serving the called mobile station and routes the call to the serving MSC. While the GMSC is shown as a separate node for clarity of illustration, it can be co-located with an MSC node.

Each mobile switching center (MSC) 14 performs telephony switching functions associated with calls involving at least one mobile or portable communications unit indicated as mobile station (MS) 20 in FIG. 1 including interfacing with other telecommunications networks and routing mobile-originated calls. The MSC handles mobile originating and mobile terminating calls. Each mobile station includes a speaker 22, a display 24, a keypad 26, and a microphone 28 as well as data processing and radio communications circuitry. Associated with each mobile switching center 14 is a visiting location register (VLR) 15 which includes a database containing temporary identification and subscriber information about all mobile stations currently located in that MSC's service area. When a mobile station enters a location area in a new MSC service area and registers with that location area's associated MSC, the VLR associated with that MSC requests data about the mobile station from that mobile's home location register (HLR) 16 and stores it. Thereafter, if the mobile station makes a call, the VLR already has the information needed for call setup. While the VLR 15 may be a stand-alone node, it is preferably integrated with the MSC 14 to eliminate network signaling between the two nodes.

The home location register (HLR) 16 is a database node that stores and manages subscriptions. For each "home" mobile subscriber, the HLR stores permanent subscriber data such as a Mobile Station ISDN number (MSISDN) which uniquely identifies the mobile telephone subscription in the PSTN numbering plan and an International Mobile Subscriber Identity (IMSI) which is a unique identity allocated to each subscriber and is used for all signaling in the PLMN 10. All PLMN-related subscriber information is connected to the IMSI. The HLR 16 also contains a list of services which a mobile subscriber is authorized to use along with a current subscriber location number corresponding to a MSC/VLR address.

A call intended for one of the mobile stations 20 is routed to the serving MSC/VLR node which then routes the call to the base station 18 associated with the cell in which the called mobile station 20 is currently located. Using well-known, established protocols and procedures, the call is forwarded over the radio interface by that base station 18 to the called mobile station 20.

In operation, each mobile subscriber is provided with a first set of services in its home network, location area, or service area. Again, for ease of description, the term "location area" is adopted as a general term referring to any geographical area which may support a different set of mobile services and may include for example a single cell or a group of cell areas as configured in a PLMN that offer the same set of services. As described in the background, the services that a particular mobile subscriber receives in one location area are not necessarily supported in other location areas. When the mobile subscriber leaves a first location area and enters a second location area, a second set of services specifically supported by the second location area is communicated to the mobile subscriber. The first and second sets of services may be different or they may be the same.

More specifically, when the mobile subscriber registers with the second location area, the second set of services supported by the second location area is determined by the corresponding MSC/VLR 14. The serving MSC/VLR 14 then communicates the supported services to the mobile terminal 20 as a text message or a voice announcement. Accordingly, the present invention apprises the mobile subscriber of the services currently supported in the location area currently serving the mobile subscriber. Those supported services may include a list of all services currently supported by that location area, or preferably, the supported services of which the mobile subscriber is notified include only those location area supported services to which the mobile subscriber actually subscribes.

Figure 2:
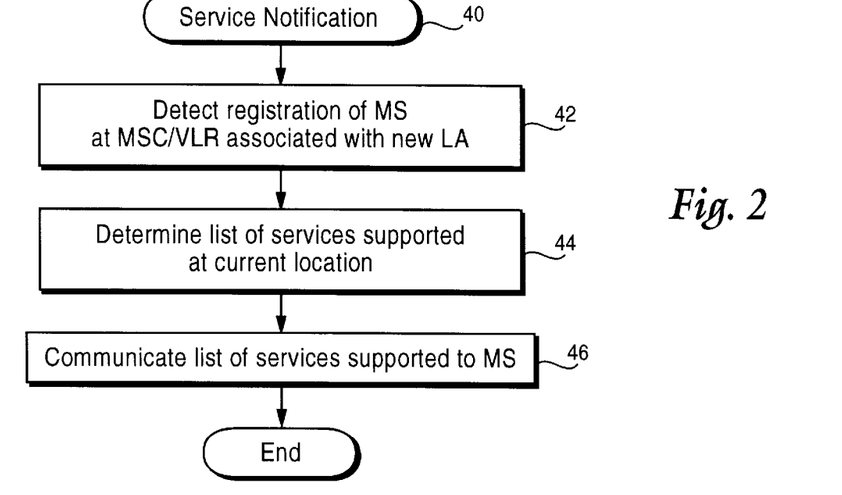
FIG. 2 is a flowchart diagram illustrating steps for implementing a service notification routine in accordance with an example of the present invention.

FIG. 2 illustrates a Service Notification routine (block 40) in accordance with the present invention. As a mobile subscriber enters into a new location area (LA), (e.g., the mobile subscriber enters a location area in a new MSC/VLR service area or a new location area within the current MSC/VLR service area), it sends a registration message to the MSC/VLR associated with the new location area (block 42). The MSC/VLR stores the new location area and also updates the location stored in the HLR in the situation where the subscriber is entering the MSC/VLR service area. Thereafter, the services currently supported by the new location area are determined (block 44). The determined list of services is then communicated to the mobile station (block 46) in one or more formats, e.g., text, voice, etc.

Figure 3:
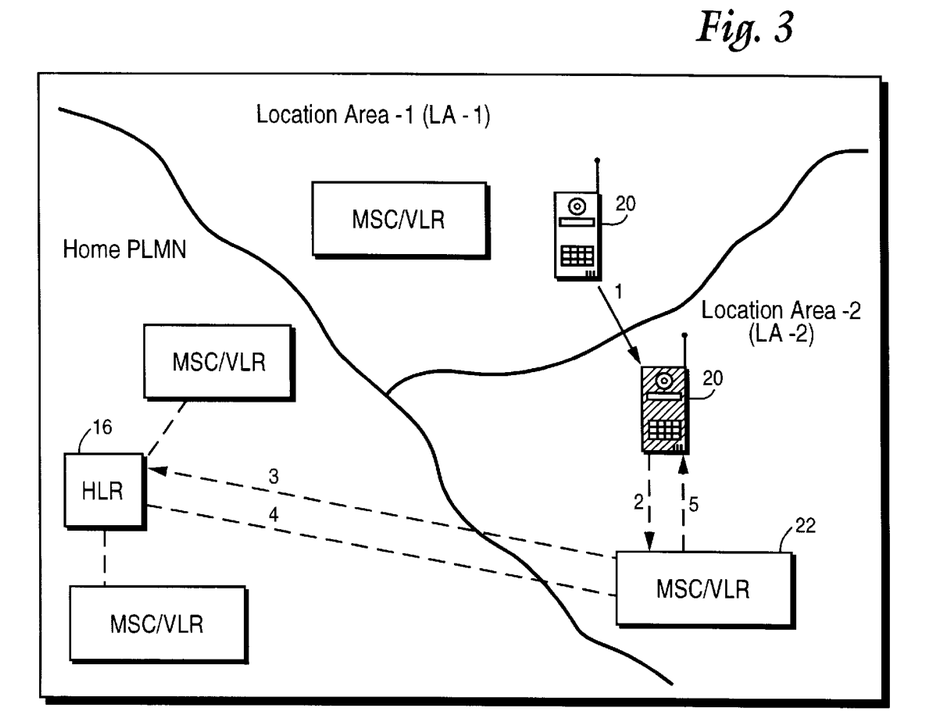
FIG. 3 is a diagram illustrating the present invention where a mobile subscriber enters a new location area.

An example application of the invention is described in conjunction with the diagram shown in FIG. 3. Upon entering a MSC/VLR service area or a location area within the current MSC/VLR service area as indicated at reference numeral 1, the mobile station 20 registers with the MSC/VLR 22 now serving the mobile station by sending a registration message indicated at reference numeral 2. The MSC/VLR 22 stores the new location area and also updates the location stored in the HLR in the situation where the subscriber is entering the MSC/VLR service area as indicated at reference numerals 3 and 4.

This coincides with the start of a notification service, following for example the procedures outlined in FIG. 2, implemented in the MSC/VLR node in accordance with program software stored and executed by the MSC/VLR data processing equipment. This example may be implemented using the PLMN shown in FIG. 1. The serving MSC/VLR 22 may use a combination of the mobile subscriber data, cell ID and location area, or one of these data, to determine which set of services are currently available to the mobile subscriber in this new location area. For example, one or more databases may store a list of services supported for each MSC (or MSC telephone number series). The serving MSC/VLR 22 may then access the database(s) and logically "AND" the list of supported services for the serving MSC/VLR with the services actually subscribed to by the roaming mobile. The common services are the ones that are communicated to the mobile subscriber. As mentioned above, an alternative would be to communicate a list of all services supported by the serving MSC/VLR.

After the list of supported services is determined, the MSC/VLR 22 sends information regarding those currently supported services in this location area as indicated at reference numeral 5. Any suitable mechanism may be employed to communicate the currently supported services to the mobile subscriber including for example sending a text message transferred by, for example, a USSD (Unstructured Supplementary Service Data—a mechanism in GSM for conveying plain text from the network to the display 24 of the mobile station 20) message to the mobile station. Alternatively, the text message may be transferred using a Short Message Service (SMS) available in most cellular networks in general and in GSM in particular. Yet another alternative is for the MSC/VLR to set up a call to the mobile station and use internal voice announcement equipment to inform the subscriber.

Figure 4:
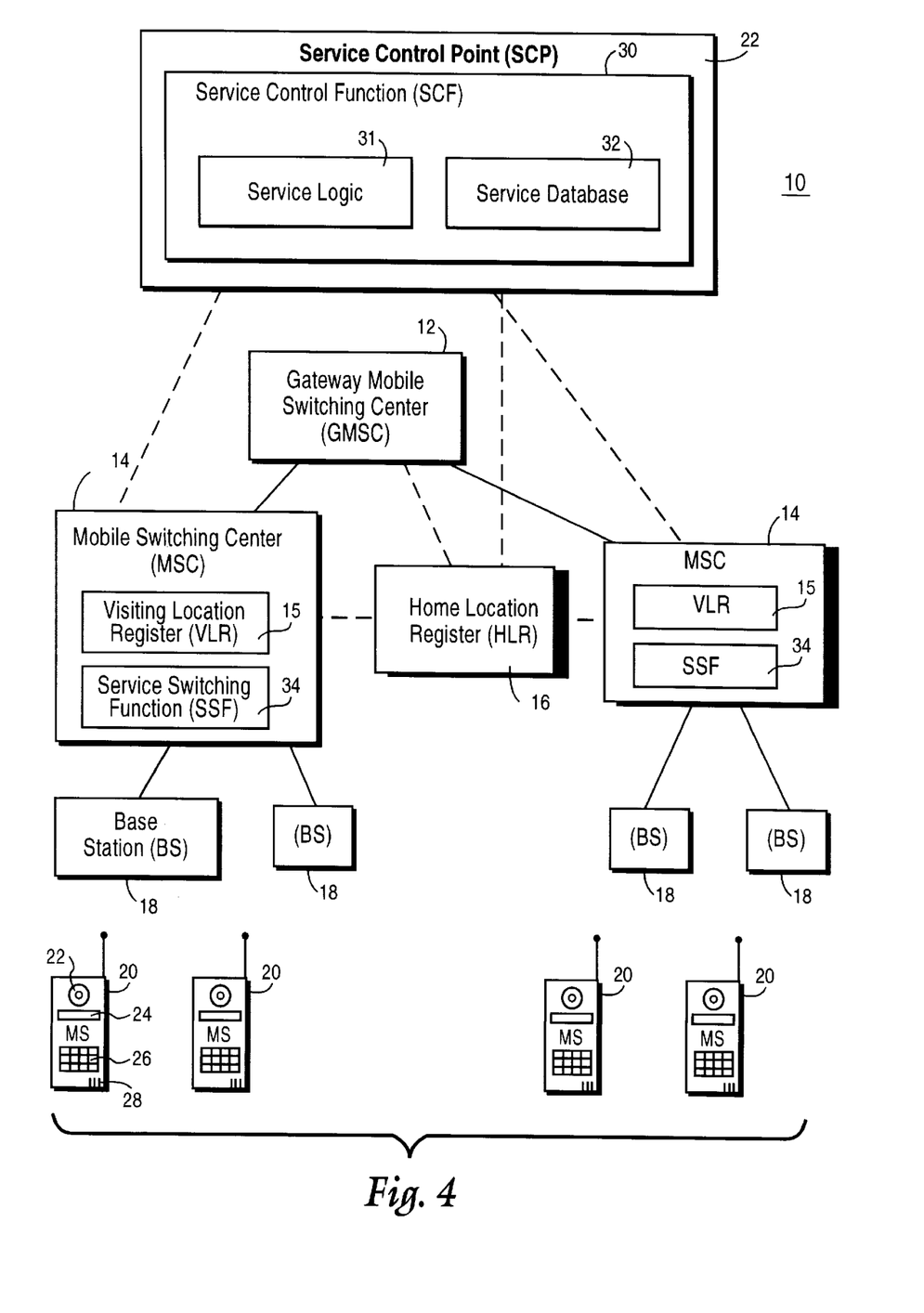
FIG. 4 is a function block diagram illustrating a PLMN with intelligent network capabilities in which the present invention may be implemented.

In addition to the example embodiment of the invention illustrated in FIG. 1, a preferred but still example PLMN for implementing the present invention is shown in FIG. 4 where like reference numerals refer to like elements from FIG. 1. The mobile switching center 14 includes a functional entity called a service switching function (SSF) 34 that interfaces the MSC 14 to a service control point (SCP) 22 that includes a Service Control Function (SCF) 30. The service switching function 34 is similar to that used in intelligent networks but uses different triggering mechanisms consistent with PLMNs. The points in the call processing at which service logic processing may be necessary are triggered by detection points (DP). The service control function includes service logic 31 corresponding to various supported mobile and services and a service database 32 used in preparing those services. The SCP 22 furthermore interfaces with the HLR 16 to receive notifications regarding location updates in the HLR.

Figure 5:
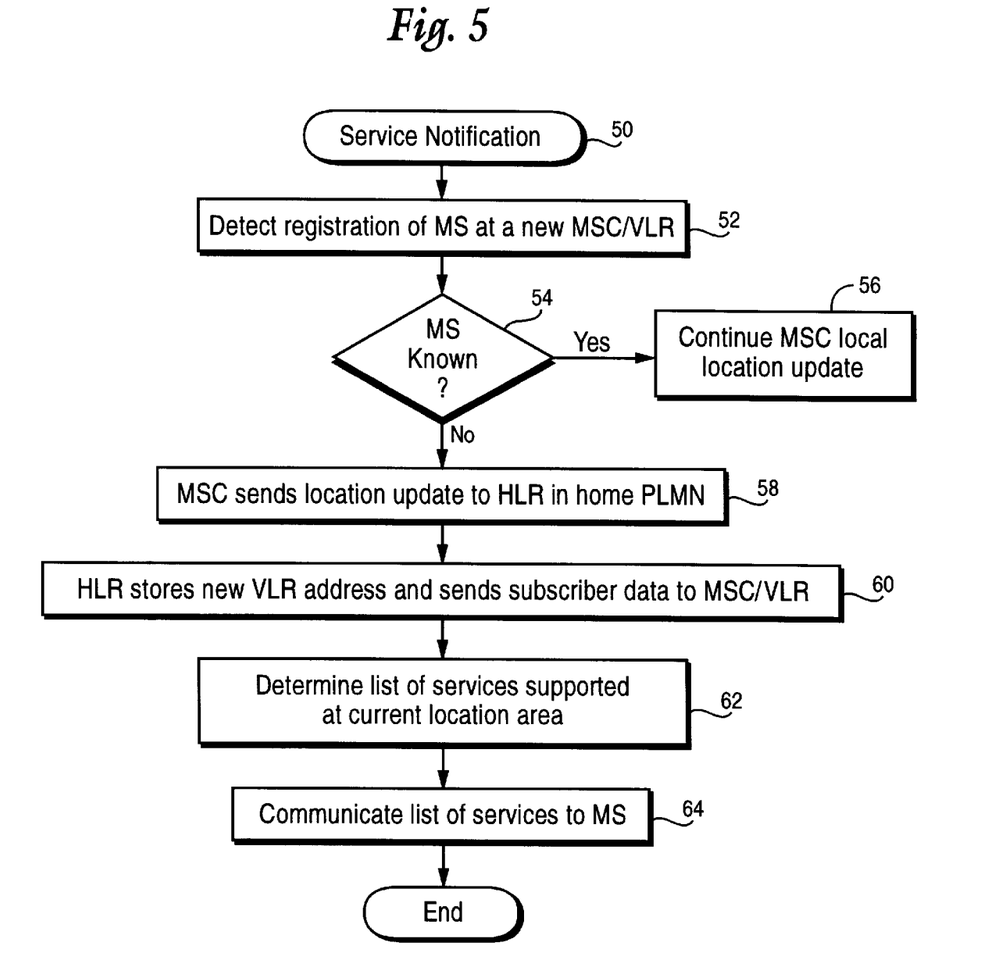
FIG. 5 is a flowchart diagram illustrating steps for implementing a service notification routine in accordance with another example of the present invention.

FIG. 5 illustrates a Service Notification routine (block 50) in accordance with another example of the present invention. As a mobile subscriber enters into a new location area, (e.g., the mobile subscriber enters a location area in a new MSC/VLR service area or a new location area within the current MSC/VLR service area), it sends a registration message to the MSC/VLR associated with the new location area (block 52). A decision is made in block 54 whether the registering mobile station (MS) was previously registered at the MSC/VLR. If so, MSC local location updating procedures, i.e. the MSC/VLR stores the new location area, continue (block 56). If not, the MSC/VLR sends a location update message to the HLR (block 58). In response, the HLR accesses the mobile subscriber's record, stores the new VLR address and sends the subscriber data to the MSC/VLR which stores the received data and the location area (block 60). In conjunction with the location updating processing in the HLR, the services currently supported in the new location area are determined (block 62). The determined list of services is then communicated to the mobile station (block 64) in one or more formats, e.g., text, voice, etc.

Figure 6:
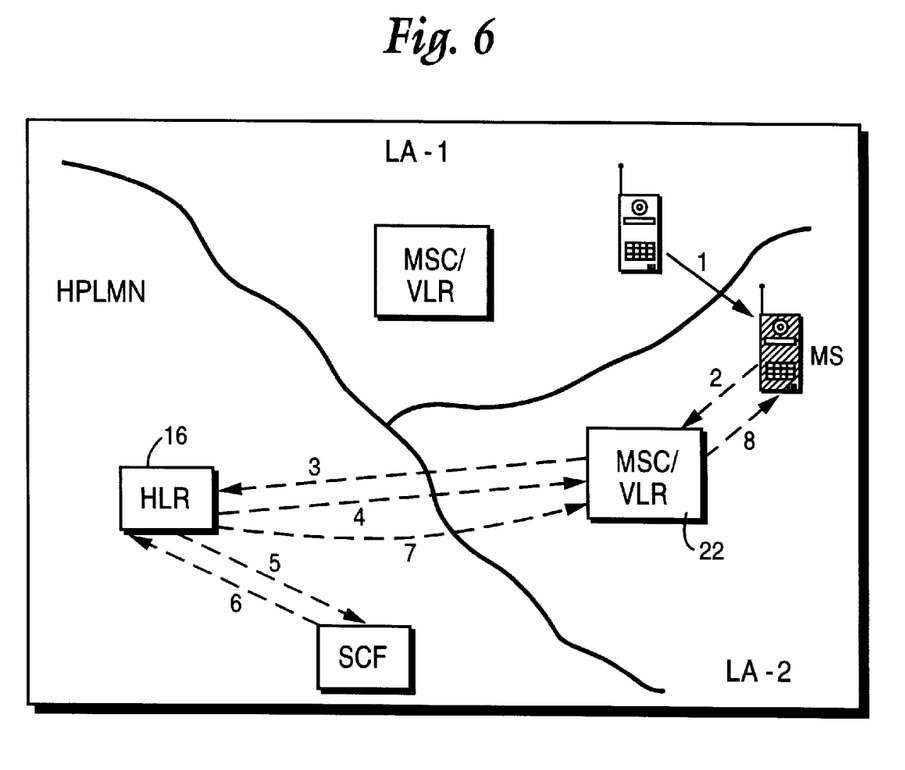
FIG. 6 is a diagram illustrating example service notification procedures using the intelligent network configuration shown in FIG. 4 for a mobile subscriber entering a new location area.

An example operation of the embodiment of the present invention as shown in FIGS. 4 and 5 is now described in conjunction with the diagram shown in FIG. 6. Upon entering a MSC/VLR service area or a location area within the current MSC/VLR service area, as indicated at reference numeral 1, the mobile station (MS) registers with the MSC/VLR 22 now serving the mobile station by sending a registration message indicated at reference numeral 2. If the mobile subscriber is not already registered in the MSC/VLR 22, the VLR sends a location update message to the HLR 16 as indicated at reference numeral 3. The HLR stores the new VLR address in the mobile's corresponding subscriber record and sends subscriber data to the new VLR 22 as indicated at reference numeral 4.

The registration operation coincides with a triggering of an IN-based Supported Services Notification Service. The HLR sends a trigger detection point notification message as indicated at reference numeral 5 to the SCF which contains the service logic for implementing the notification service. The service logic in the SCF may use a combination of the mobile subscriber data, cell ID, location area, and visiting network currently serving the mobile subscriber, or one of these data, to determine which set of services are currently available to the mobile subscriber in this new location area. The determined list of services supported by the new location area is then communicated to the mobile station in an appropriate format. For example, the SCF may send a USSD message via the HLR, as indicated at reference numeral 6 and 7, and the MSC/VLR 22, as indicated at reference numeral 8, to the mobile station. The SCF may also send the determined list of services using other interfaces and mechanisms such as direct sending of a USSD message to the MSC/VLR 22 where the subscriber is registered, (i.e., the HLR is not involved), or using the Short Message Service (SMS) available in most cellular networks.

Figure 7:
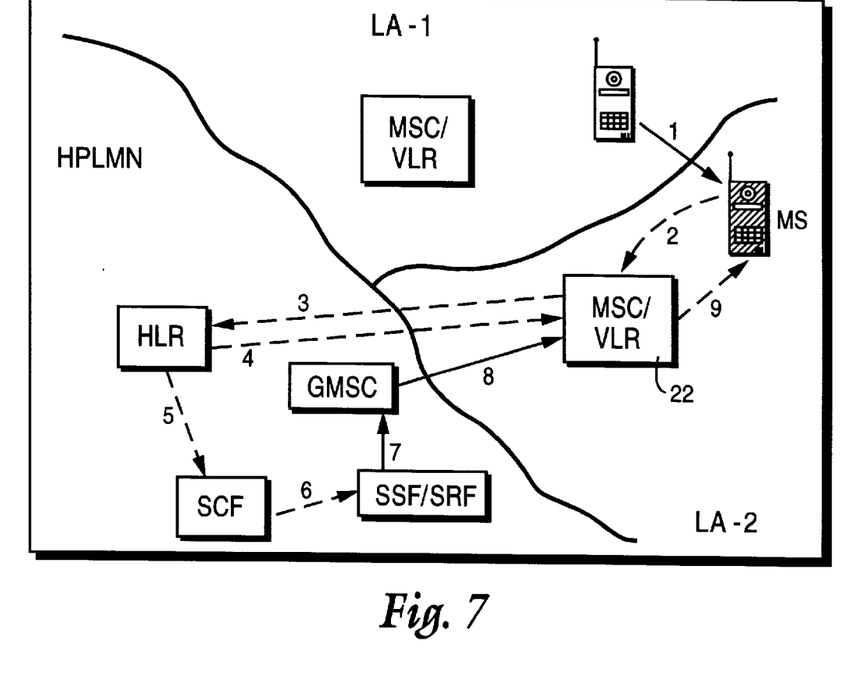
FIG. 7 is a diagram illustrating another set of example service notification procedures using the intelligent network configuration shown in FIG. 4 for a mobile subscriber entering a new location area.

An alternative approach to communicating the list of supported services is now described in conjunction with FIG. 7. The procedures performed up through reference numeral 5 are the same as explained above with respect to FIG. 6. However, after the SCF has determined the list of supported services, the SCF orders the Service Switching Function (SSF) together with a Specialized Resource Function (SRF) or a stand-alone specialized resource function such as an Intelligent Peripheral (IP), to set up a speech connection to the mobile station and play in an announcement the list of services currently supported to the mobile station as indicated at reference numerals 6, 7, 8, and 9. The SRF or IP may be located in the home network or in another geographical location but under the control of the home network.

The present invention therefore provides mobile subscribers with accurate, up-to-date, real-time information on what services are currently supported by the current location area serving the mobile subscriber. The list of supported services is communicated in a user-friendly format and automatically as soon as the mobile subscriber enters a new location area. An additional benefit is that the behavior of the communications environment seen from the mobile subscriber viewpoint is predictable even though the support of services from different location areas may differ between networks and within a single network.

One possible disadvantage with the example in FIG. 3 is that in order for an operator to provide the notification service to the operator's subscribers roaming in other visiting networks, some modification in the visiting networks is necessary including, for example, installation of software in the MSC/VLRs to support the notification service. Therefore, a benefit with the preferred examples shown in FIGS. 6 and 7 is that technical support in visiting networks is not required. Rather, the present invention in those embodiments may be implemented entirely in the home network permitting ready assimilation into existing networks with minimum impact. Another benefit with the examples shown in FIGS. 6 and 7 is that the service logic residing in the home PLMN can more easily access all data needed in order to determine the set of supported services. The present invention may be used when the mobile subscribers roam outside the home PLMN as well as when the mobile subscribers roam in the home PLMN.

Figure 8:
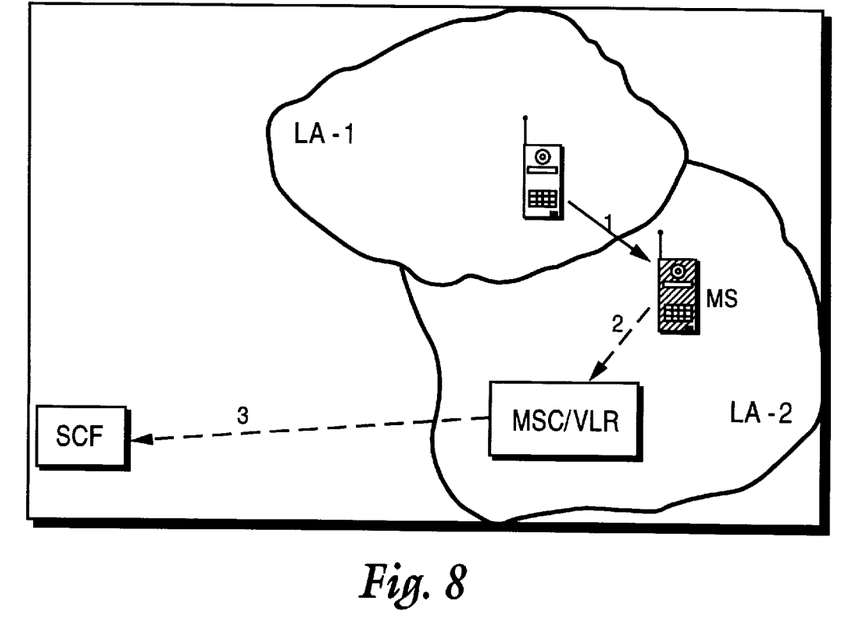
FIG. 8 is a diagram illustrating still another set of example service notification procedures using the intelligent network configuration shown in FIG. 4 for a mobile subscriber entering a new location area.

FIG. 8 shows yet another variation where a mobile station leaves location area-1 (LA-1) and enters a new location area-2 (LA-2). When that occurs, the mobile station sends a location updating message to the MSC/VLR serving location area-2. The triggering condition(s) for the notification service and the address of the SCF/SCP node are downloaded as part of the subscriber data sent from the HLR to the MSC/VLR. The notification service is initiated at the MSC/VLR if the service triggering condition(s) are fulfilled, e.g., that the location updating has been successfully executed. The MSC/VLR then sends a notification service trigger detection point to the SCF containing the notification service logic. The notification service is handled as described above in FIGS. 6 and 7. This example shares most of the advantages of the previously described examples with the further benefit that the HLR is omitted from the notification service trigger detection and rendering. The trade-off, however, is the need for additional software in the visited network to support triggering of a notification service.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a mobile communications system having a plurality of location areas for providing mobile communications services to mobile subscribers, a method comprising the steps of:

providing a first set of services to one of the mobile subscribers in a first location area;

the one mobile subscriber entering a second location area; and using an intelligent network service to determine a second set of services supported by the second location area when the one mobile subscriber registers with the second location area and to communicate to the one mobile subscriber in the second location area the second set of services supported by the second location area.

2. The method in claim 1, wherein the second set of services includes only those services subscribed to by the one mobile subscriber which are supported by the second location area.

3. The method in claim 1, wherein the second set of services includes all services supported by the second location area.

4. The method in claim 1, wherein the first and second sets of services are different and the second set of services includes only those services subscribed to by the one mobile subscriber which are supported by the second location area.

5. The method in claim 1, wherein the first and second sets of services are the same.

6. The method in claim 1, wherein the communicating step occurs when the one mobile subscriber registers with the second location area.

7. The method in claim 1, wherein the intelligent network (IN) service is performed using an IN service control function (SCF) which executes corresponding service logic when a trigger point notification is received by the SCF.

8. The method in claim 1, wherein the second set of services is communicated to the mobile subscriber by text message or voice announcement.

9. In a mobile communications system having plural mobile subscribers, a first location area in which a first set of mobile communications services is provided, and a second location area where a second set of mobile communications services is provided, a controller comprising an intelligent network service control function (SCF) communicating to one of the mobile subscribers the second set of services supported by the second location area when the one mobile subscriber enters the second location area, wherein a trigger detection point notification is sent to the SCF causing the SCF to execute service logic to determine the second set of services when the one mobile subscriber enters the second location area.

10. The mobile communications system in claim 9, further comprising:

a home location register (HLR);

a first visiting location register (VLR) associated with the first location area; and a second visiting location register (VLR) associated with a second location area.

11. The mobile communications system in claim 10, wherein the second VLR or MSC/VLR sends a trigger detection point notification to the SCF.

12. The mobile communications system in claim 10, wherein the HLR sends a trigger detection point notification to the SCF.

13. The mobile communications system in claim 9, wherein the controller uses mobile subscriber location data and data about the supported capabilities in the serving network to determine the second set of services available to the one mobile subscriber.

14. The mobile communications system in claim 9, wherein the second set of services includes only those services subscribed to by the one mobile subscriber which are supported by the second location area.

15. The mobile communications system in claim 9, wherein the second set of services includes all services supported by the second location area.

16. The mobile communications system in claim 9, wherein the first and second sets of services are different and the second set of services includes only those services subscribed to by the one mobile subscriber which are supported by the second location area.

17. The mobile communications system in claim 9, wherein the first and second sets of services are the same.

18. The mobile communications system in claim 9, wherein the second set of services is communicated to the one mobile subscriber by text message.

19. The mobile communications system in claim 18, wherein the controller sends the text message to the one mobile subscriber by way of the HLR.

20. The mobile communications system in claim 18, wherein the controller sends the text message to the one mobile subscriber by way of the MSC/VLR.

21. The mobile communications system in claim 18, wherein the second set of services is communicated to the one mobile subscriber by voice announcement.

22. The mobile communications system in claim 21, wherein the controller sends the voice announcement by establishing a speech connection to the one mobile subscriber using an intelligent network service switching function (SSF) and an intelligent network Specialized Resource Function (SRF).

* * * * *